US007045087B2

(12) United States Patent
Kotov

(10) Patent No.: US 7,045,087 B2
(45) Date of Patent: May 16, 2006

(54) ASSEMBLY OF FREE-STANDING FILMS USING A LAYER-BY-LAYER PROCESS

(75) Inventor: Nicholas A. Kotov, Stillwater, OK (US)

(73) Assignee: The Board of Regents for Oklahoma State University, Stillwater, OK (US)

( * ) Notice: Subject to any disclaimer, the term of this patent is extended or adjusted under 35 U.S.C. 154(b) by 323 days.

(21) Appl. No.: 09/818,001

(22) Filed: Mar. 27, 2001

(65) Prior Publication Data

US 2001/0046564 A1 Nov. 29, 2001

Related U.S. Application Data

(60) Provisional application No. 60/192,750, filed on Mar. 28, 2000.

(51) Int. Cl.
 *B29C 41/22* (2006.01)
(52) U.S. Cl. ............... 264/255; 264/304; 264/305; 264/306; 264/307; 264/313; 264/334
(58) Field of Classification Search ............... 264/255, 264/313, 304, 305, 306, 307, 334
See application file for complete search history.

(56) References Cited

U.S. PATENT DOCUMENTS

| 4,333,961 A | | 6/1982 | Bruce et al. | |
| 5,518,767 A | | 5/1996 | Rubner et al. | |
| 6,020,175 A | * | 2/2000 | Onda et al. | 435/180 |
| 6,022,590 A | * | 2/2000 | Ferguson et al. | 427/354 |
| 6,114,099 A | * | 9/2000 | Liu et al. | 430/324 |
| 6,372,364 B1 | * | 4/2002 | Hunt et al. | 428/607 |
| 6,391,220 B1 | * | 5/2002 | Zhang et al. | 216/67 |
| 6,447,887 B1 | * | 9/2002 | Claus et al. | 428/209 |

FOREIGN PATENT DOCUMENTS

| CA | 1251860 | 3/1989 |
| EP | 0 101 826 A1 | 6/1983 |
| JP | 04 090307 | 3/1992 |
| WO | WO 96/07487 A1 | 3/1996 |
| WO | WO 00/17103 | 3/2000 |
| WO | WO 00/17642 | 3/2000 |
| WO | WO 00/17655 | 3/2000 |
| WO | WO 00/17656 | 3/2000 |
| WO | WO 00/44507 | 8/2000 |

OTHER PUBLICATIONS

International Search Report prepared by the ISA/EP in connection with corresponding international application No. PCT/US01/09833 with a mailing date of Aug. 10, 2001.

* cited by examiner

*Primary Examiner*—Edmund H. Lee
(74) *Attorney, Agent, or Firm*—Fellers, Snider, Blankenship, Bailey & Tippens, P.C.

(57) ABSTRACT

A method for the layer-by-layer assembly of a free standing thin film includes the steps of preparing a support with a suitable substrate; forming a thin film having a plurality of layers onto the substrate utilizing a layer-by-layer assembly process; removing the substrate and thin film from the support; and separating the substrate from the thin film. Various compounds improving the strength, flexibility, tension and other mechanical properties may be included in the assembly to improve the structural quality of the film. Similar effect may also be achieved by cross-linking the applied layers.

14 Claims, 4 Drawing Sheets

ASSEMBLY OF FREE-STANDING FILMS USING A LAYER-BY-LAYER PROCESS

CROSS REFERENCE TO RELATED APPLICATION

This application claims the benefit of prior filed copending U.S. provisional application Ser. No. 60/192,750 filed Mar. 28, 2000.

STATEMENT REGARDING FEDERALLY SPONSORED RESEARCH

The development of the subject matter of this application was partially supported by a grant from the National Science Foundation (EDS-9876265). Accordingly, the U.S. government may have rights in this invention.

BACKGROUND OF THE INVENTION

1. Field of the Invention

This invention relates generally to a method for the assembly of free-standing films using a layer-by-layer process. More particularly, but not by way of limitation, the present invention relates to a method for producing ultra-thin membranes wherein the membrane is first assembled on a soluble or otherwise removable substrate. Upon completion of the membrane assembly, the substrate is dissolved in a suitable solvent or removed by other means leaving behind the free-standing membrane.

2. Background

Thin film technology, wherein inorganic particles with sizes on the order of 1–100 nm are arranged in layers to form a film, is being used presently for an increasingly large number of different technological applications, including, among other things, information storage systems, chemical and biological sensors, fiber-optical systems, magneto-optical and optical devices, pervaporation membranes, protective coatings and light emitting diodes. Current techniques for preparing such films include chemical vapor deposition (in which no discrete inorganic particles are involved), sol-gel technology (producing porous materials that can be sintered to get uniform films), or deposition from colloidal dispersions (spin-coating, dip-coating, Langmuir-Blodgett deposition, etc.).

Layer-by-layer assembly (LBL) is a method of thin film deposition which is often used for oppositely charged polymers or polymers otherwise having affinity and has recently been applied to the preparation of thin films of nanoparticles. Its simplicity and universality, complemented by the high quality films produced thereby, make the layer-by-layer process an attractive alternative to other thin film deposition techniques. LBL can be applied to a large variety of water-soluble compounds and is especially suitable for the production of stratified thin films in which layers of nanometer thickness are organized in a specific predetermined order. Such a process is described in U.S. patent application Ser. Nos. 60/151,511 and 09/492,951, which disclosures are incorporated herein by reference.

Typically, layer-by-layer films are assembled on a solid substrate material such as a glass slide or silicon wafer. Deposition of the film material onto the substrate is performed in a cyclic manner, made possible by the overcompensation of surface charge which often takes place when polyelectrolytes and other high molecular weight species are adsorbed on a solid-liquid interface. As used herein, a "high molecular weight" material refers to polymers, including proteins, nanoparticles, exfoliated clays and other organic and inorganic species, having a molecular weight greater than about 1000 atomic units. In one example of a layer-by-layer assembly process, after preparation of the substrate, a film is deposited on the substrate by repeating the process of: 1) immersion of the substrate in an aqueous solution of polyelectrolyte; 2) washing with neat solvent; 3) immersion in an aqueous dispersion of nanoparticles; and 4) final washing with neat solvent. This process is repeated as many times as necessary, depending on the number of layers required in order to obtain the specific properties of the desired material.

In the prior art, this process has been limited to applications wherein the substrate and the assembled film remain intact as a unitary structure. This limits the minimum thickness of a film and limits the application of films produced through this process to those tolerant of the substrate material. The present invention, however, provides a process wherein the assembled thin film may be separated from the substrate to form a free-standing thin film material overcoming these and other limitations.

Membranes are typically prepared by casting a solution of a polymer on a solid substrate. In this technique, the structure of the membrane is determined by the chemical structure of the casting material. Extensions of this generic method, including casting on an immiscible solvent or post factum surface grafting, can also yield asymmetrical membranes with chemically modified membrane surfaces.

It is thus an object of the present invention to provide a method for the assembly of free-standing thin film materials using a layer-by-layer process.

It is a further object of the present invention to provide a method for the assembly of free-standing thin film materials using a layer by layer process wherein the assembled thin film material exhibits structural properties which allow for manipulation of the assembled material.

It is another object of the present invention to provide a method for the assembly of free-standing thin film material which permits improved control over a membrane structure allowing for the production of stratified multifunction membranes.

It is yet another object of the present invention to provide a method for the assembly of free-standing thin film material which permits the incorporation of biological compounds into the membrane structure while retaining the biological activity of the compounds.

It is still another object of the present invention to provide a free standing thin film material wherein at least one layer of the material includes an inert structural stabilizing element, such as exfoliated montmorillonite clay platelets, or wherein cross-linking of layer by layer films is achieved, to improve the structural properties of the thin film material.

SUMMARY OF THE INVENTION

These and other objects and advantages are achieved in a method for the assembly of free standing thin film material using a layer-by-layer process. First, a desirable sequence of layers is assembled on a substrate utilizing the LBL technique. At this step, the structure and functionality of the thin film or membrane is defined. Second, the substrate is separated from the assembled layers, leaving behind a free-standing thin film or membrane. In this form or after minor modification, the thin film or membrane can be used in designated applications.

In the present inventive method, the layer-by-layer deposition process is initially carried out on a solid substrate.

When a degree of structural sophistication and/or a desirable thickness is achieved, the assembled thin film material is separated from the substrate. Soluble substrates may be dissolved with suitable organic solvents, or the substrate may be removed by other means, such as decomposition or restructuring of the layer connecting the membrane and the substrate. In some instances, the prepared film can be mechanically removed from the substrate.

In one embodiment, a soluble substrate is supported by a glass slide to facilitate lift-off of the completed assembly and for realization of the dipping cycle. The layer-by layer assembly is carried out in a conventional manner by: 1) dipping the supported substrate in a first aqueous solution of a water-soluble first substance, the first substance possessing an affinity for the substrate; 2) rinsing in neat solvent, such as deionized water, methanol or other suitable compositions free of the substances being applied; 3) dipping in a second aqueous solution of a water-soluble second substance, the second substance having an affinity for the first substance; and 4) rinsing in neat solvent. These steps are repeated in a cyclic fashion until the desired number of layers have been deposited. As used herein, one substance can be said to have an affinity for another substance via either an electrostatic attraction or by virtue of van der Waals' forces, hydrogen forces or electron exchange.

The sequence of the layers, i.e., the membrane structure, is determined by the order of dipping. The substances that are adsorbed at various layers may be easily varied such that layers of different materials can be combined depending on the required functionality or combination of functions required. Thus, sequential adsorption of monolayers of polyelectrolytes, dyes, nanoparticles (metal, semiconducting, magnetic, etc.), polymers, proteins, vesicles, viruses, DNAs, RNAs, oligonucleotides, organic and inorganic colloids and other substances on layers of, for example, a polyelectrolyte having an affinity therefor allows for the unprecedented control over membrane structure, production of multifunctional membranes, incorporation of biological compounds into the membrane structure while retaining their biological activity, and improvement of the performance of membranes in most applications.

After depositing the appropriate number of layers, the substrate is removed by dissolution in an appropriate solvent, or, alternatively, the substrate may be removed through other chemical treatment, heat treatment, pH-change, ionic strength change, or other means suitable to achieve the appropriate separation. In one case, a film may be assembled on a metallic gallium substrate, which is melted away. After the substrate has been removed, a free-standing thin film is left.

Films produced by this process may be extremely thin, on the order of a few hundred nanometers. It has been found that by including steps wherein layers of exfoliated montmorillonite clay platelets are deposited into the film, the mechanical strength of the film may be radically improved. Alternatively, one can also use chemical, radiative, photo or other means to achieve cross-linking amongst the layers to improve the mechanical properties of the films.

The free-standing LBL films produced in accordance with the present invention allow for the exploitation of these assemblies as ultrathin membranes with a variety of possible applications, which, by way of example and not limitation, include: gas separation; desalination; decontamination; ion-separation; sensing devices; optical devices; micromechanical devices and protective devices, as well as in the creation of biological devices such as skin prosthetics, biocompatible implants, cell membranes, artificial organs, and artificial blood vessels and cornea. Preparation of such films from inorganic colloids affords a rich palette of mechanical, chemical, optical, electrical and magnetic properties. These properties are complemented by the mechanical durability of the polymers and biological activity of proteins, DNAs, RNAs, etc. that can also be incorporated into the LBL film. The LBL mode of their preparation makes possible the degree of structural organization of such membranes, which is hardly attainable by traditional methods of their production.

A better understanding of the present invention, its several aspects, and its objects and advantages will become apparent to those skilled in the art from the following detailed description, taken in conjunction with the attached drawings, wherein there is shown and described the preferred embodiment of the invention, simply by way of illustration of the best mode contemplated for carrying out the invention.

DETAILED DESCRIPTION OF THE PREFERRED EMBODIMENT

Figure 1:
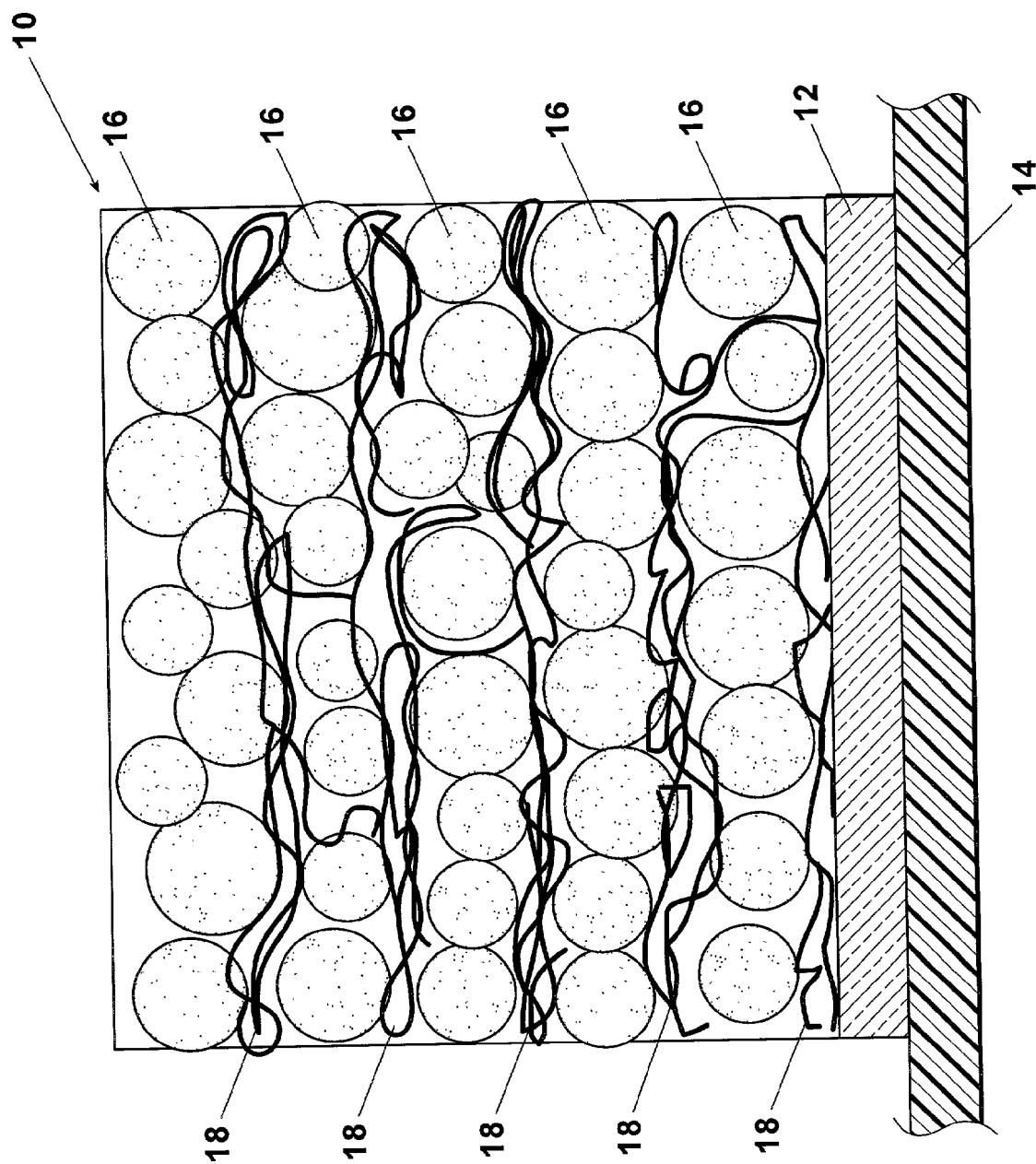
FIG. 1 is a cross-sectional representation of a film prepared by the inventive process prior to removal from the support and substrate media.

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

The preferred embodiment of the present inventive method encompasses the assembly of a free-standing, ultrathin membrane of mono- or multilayers, by means of a layer-by-layer ("LBL") self-assembly technique. In the inventive method, the thin film material is first assembled on a substrate. After the desired number of layers have been applied, the substrate is removed, leaving the free standing thin film.

More particularly, the process for the assembly of free-standing thin films, utilizing in this case a soluble substrate, includes the steps of:

on a suitable support having been cleaned to remove surface contaminants, casting a solution of a substrate material dissolved in a suitable solvent onto a surface of the support;

evaporating the solvent to leave a film of substrate on the surface of the support;

forming at least one layer of thin film material by the substeps of:

a.) immersion of the substrate in a first aqueous solution or dispersion of a first substance, the first substance having an affinity for the substrate, so as to apply one layer of said first substance to the substrate;

b.) rinsing the substrate with neat solvent;
c.) immersion of the substrate in a second solution or dispersion of a second substance, the second substance having an affinity for the first substance, so as to apply one layer of said second substance upon said first substance; and
d.) final washing with neat solvent;

repeating the previous substeps to accumulate the desired number of layers of said first and second substances (or layers of differing substances of appropriate affinity) to achieve the required thickness or obtain the desired properties;

peeling the substrate and film from the support as a unit; and immersion of the substrate and film in a suitable solvent which will dissolve the substrate material without harming the thin film.

The support may comprise glass, quartz, plastics or other suitable inert materials as are known in the art.

When a soluble substrate is used, the substrate material is limited only by the conditions that it 1) is soluble in an organic solvent which will not harm the thin film material; and 2) has an affinity with the first applied substance forming the first film layer, serving as a foundation for the film. These requirements are satisfied, for example, for cellulose acetate, a preferred substrate, which is insoluble in water, but dissolves readily in acetone at room temperature. Concomitantly, the surface of cellulose acetate is fairly hydrophilic displaying contact angles of 50–55 degrees. It also carries some negative charge from partial hydrolysis of surface ester groups.

In the preferred embodiment, the first aqueous solution or dispersion of an oppositely electrostatically charged first substance comprises a positively charged polyelectrolyte. The electrostatic attraction between the polyelectrolyte and the substrate results in the adsorption of a layer of polyelectrolyte to the substrate. It should be understood, however, that the first substance may be one of a variety of materials, as aforedescribed, having a positive electrostatic charge and contained in a solution or dispersion or otherwise having an affinity for the substrate.

The second solution or dispersion of an electrostatically charged second substance comprises, in the preferred embodiment, a negatively charged material such as, by way of example and not limitation, polyelectrolyte, polymers, proteins, dyes, metal and semiconductor nanoparticles, magnetic nanoparticles, vesicles, viruses, DNA, RNA and the like.

Substitutions of substances with a like charge or affinity may be made for said first and second substances to achieve the sequential adsorption of layers of a plurality of substances resulting in desired membrane properties.

The process as described above allows for the accumulation of a variety of different materials adsorbed into a film at desired levels. In one embodiment of the inventive process inert structural stabilizing elements, such as exfoliated montmorillonite clay platelets, carbon nanotubes, carbon fibers or similar materials, are deposited into the film to improve the mechanical properties of the resulting film.

Referring now to the drawings, wherein like reference numerals designate identical or corresponding parts throughout the several views, and, more specifically, to FIG. 1, there is illustrated a thin film 10 constructed in accordance with the preferred embodiment of the present invention. The film 10 is formed on a substrate 12 which, in the examples, is soluble in an organic solvent. The substrate 12 is preferably deposited onto a support 14 to aid in the dipping process, Individual layers of one substance 16 are arranged by virtue of the LBL assembly process in layers separated by layers of another substance having affinity thereto 18.

Typically, substrate 12 is first applied to support 14. Support 14 is preferably a glass slide, silicon wafer, or other suitable rigid structure. Preferably, substrate 12 is cast onto a cleaned surface of support 14. Next, the film 10 is assembled onto the substrate 12 in a layer-by-layer technique as outlined above by alternating layers of a first substance 18, e.g. of a positive charge, and layers of a second substance, e.g. of a negative charge, having an affinity to the first substance 16.

Figure 2:
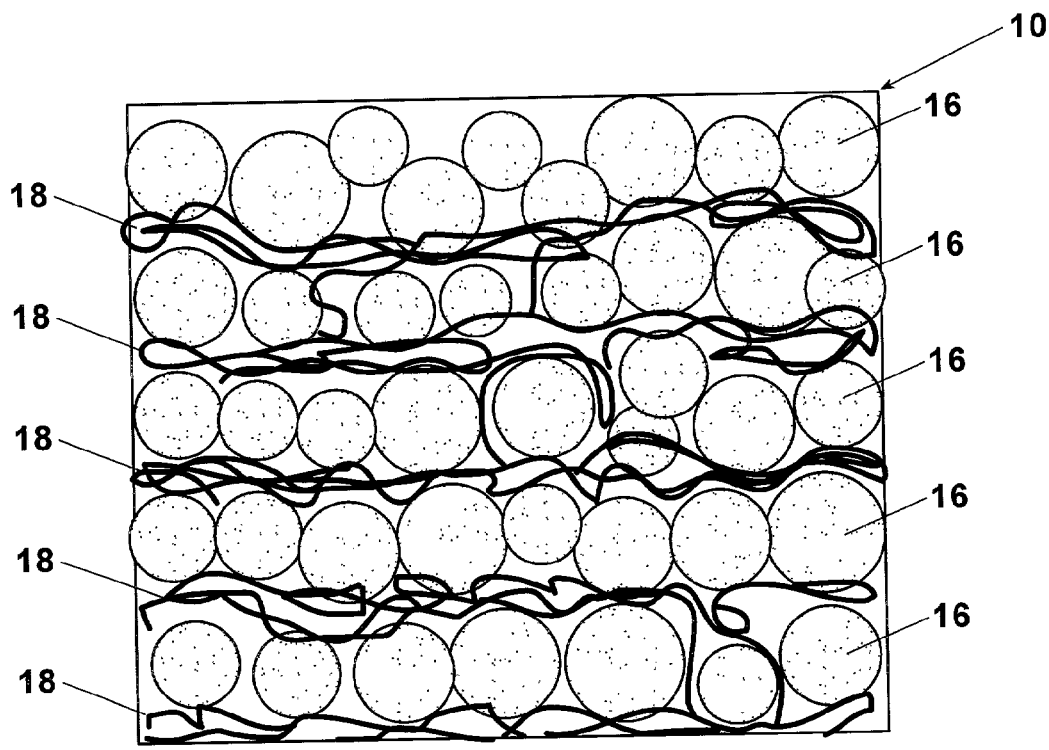
FIG. 2 is a cross-sectional representation of a free-standing film prepared by the inventive process.

After completion of the LBL assembly as detailed above, the film 10 and substrate 12 are peeled as a unit from the support 14. The film 10 and substrate 12 are then separated. If by dissolution, the film 10 and substrate 12 are placed in a suitable solvent which dissolves the substrate 12 while leaving the film 10 unharmed. Referring to FIG. 2, upon complete removal of the substrate 12, a free-standing film 10 of the desired structure is left.

Figure 3:
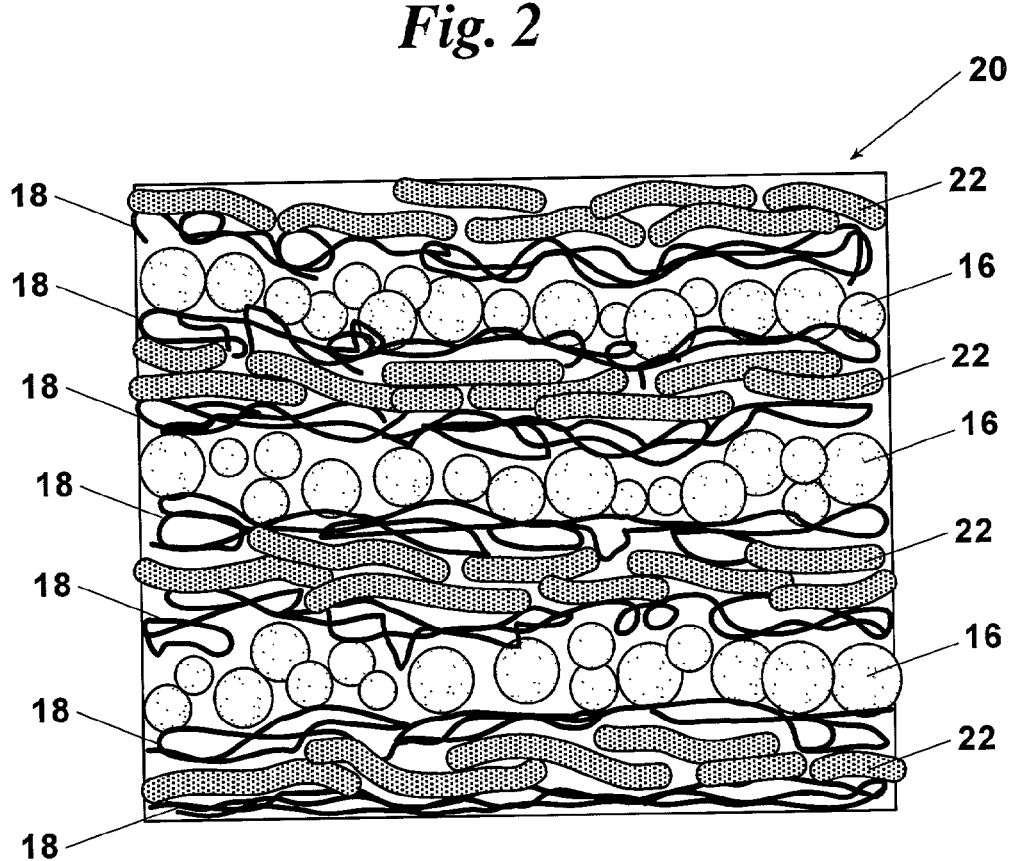
FIG. 3 is a cross-sectional representation of a free standing film prepared by the inventive process which includes alumosilicate layers therein.

In one embodiment of the inventive method as shown in FIG. 3, exfolliated montmorillonite clay platelets 22 are deposited into the film 20 in every-other dipping of negative material to improve the structural properties of the resulting film. As can be seen, this process results in alternating layers of clay 22 and one or more additional layers of negatively charged material 16 separated by layers of positively charged material 18.

The present invention will be further understood with reference to the following non-limiting experimental examples.

EXAMPLE 1

A glass slide was selected as the support material for the substrate. The glass surface was throughly cleaned in hot $H_2O_2/H_2SO_4$ (1:3) mixture for 5 minutes. Subsequent to drying, a few drops of 15% solution of cellulose acetate in acetone were cast on the slide and allowed to spread forming a uniform coating. The slide was immediately placed in a desiccator and the solvent was allowed to slowly evaporate. When the film solidified, traces of acetone were completely removed in a vacuum.

The LBL assembly was performed by a cyclic repetition of the following operations: 1) dipping of the cellulose acetate coated slide in 1% aqueous solution of poly(dimethyldiallylammonium bromide) 400–500 kDa, P, for one minute; 2) rinsing in deionized water for 1 minute; 3) dipping in a solution of negatively charged colloid for 1 minute; and 4) rinsing in deionized water.

The films were made using colloidal solution of negatively charged magnetite nanoparticles which were 8 to 10 nanometers in diameter. Aqueous dispersions of magnetite nanoparticles were prepared according to the procedure published by Correa-Duarte, M. A.; Giersig, M.; Kotov, N. A.; Liz-Marzan, L. M. in *Langmuir,* 1998, 14, 6430–6435, said publication being incorporated herein by reference. Briefly, 20 mL of $FeCl_3$ (1M) and 5 mL of $FeSO_4$ (2M) in 2M HCl were added to 250 mL of $NH_4OH$ (0.7 M) under rapid mechanical stirring, which was allowed to continue for 30 minutes. The black solid product was decanted with the help of a magnet. The sediment was then redispersed in 50 mL of distilled water, and subsequently three aliquots of 10 mL tetramethylammonium hydroxide solution (1M) were added, again with rapid stirring. Finally, water was added to the dispersion up to a total volume of 250 mL. In this way a stable dispersion of crystalline, approximately spherical magnetite nanoparticles are obtained with an average diameter of 12 nm.

The stability of the colloid originated primarily from the strong electrostatic repulsion of the particles, and, to a lesser degree, from the physisorption of bulky tetraalkylammonium cations preventing their physical contact. Electrostatic and van-der-Waals interaction with the positive monolayer caused destabilization of the colloid, which made absorption virtually irreversible. At the same time, the negative charge acquired by the film surface limited absorption to essentially a monolayer of nanoparticles. Due to the cyclic nature of the deposition process, the film produced in n deposition cycles is hereinafter referred to as $(M)_n$. One dipping sequence, $(M)_1$, resulted in the addition of a polyelectrolyte-magnetite layer combination with an average thickness of 8±0.5 nanometers. This increment remained virtually constant for at least 50 deposition cycles as observed from the linearity of the integrated optical density as the assembly progressed. Atomic force microscopy images of $(M)_1$ revealed that the film was made of densely packed nanoparticles.

After depositing an appropriate number of layers and thorough drying, the thin cellulose acetate substrate, along with the LBL film, was peeled off the glass support and immersed in acetone for 24 hours. The substrate dissolved leaving a dark colored film freely suspended in the solution. The film was transferred into a fresh acetone bath to completely wash away remaining cellulose acetate molecules. As expected, the thin film obtained through this process retained the magnetic properties of the nanoparticles: the film moved in a wave-like manner through the solution toward a permanent magnet placed near the side of the beaker.

From the suspended state, the films could be transferred onto any solid or porous substrate. In light of the fact that the thickness of the prepared films, i.e. $(M)_{15}$ and $(M)_{30}$, was in the range of a few hundred nanometers, they may be considered to be quite fragile.

EXAMPLE 2

Layer-by-layer assembly affords manipulation of the order of deposited layers. To strengthen the film, every-other layer of magnetite may be replaced with a layer of exfoliated montmorillonite clay platelets, the assembly of n layers of which is hereinafter referred to as $(C/M)_n$. Clay platelets have a thickness of 1.0 nanometer, while extending 150–300 nanometers in the other dimensions. On polyelectrolytes, they formed a layer of overlapping alumosilicate sheets with an average thickness of 3.8±0.3 nanometers. Being adsorbed virtually parallel to the surface of the substrate, their large size allowed them to cover approximately 400 nanoparticles at once, thereby cementing the assembly. $(C/M)_{30}$ free-standing film prepared following the procedure outlined above could be easily picked up with tweezers, transferred, cut, moved around a solid surface, and handled in any other way. Taking advantage of this architecture, free standing films with as few as 5 repeating C/M units were assembled. Without the alumosilicate framework, this was impossible.

The $(C/M)_{30}$ assembly was imbedded in epoxy resin and cross-sectioned to investigate by optical microscopy and transmission electron microscopy (TEM). The optical microscopy image demonstrated that the film was continuous and flexible. The thickness of the film, as determined by TEM, was 350 nanometers, virtually identical to the estimate predicted by adding the cumulative M and C layers. For $(C/M)_{30}$ film:

(3.8 (nm/alumosilicate layer)+8.0 (nm/magnetite layer))
*30 layers=354 nm

Well within the tolerances measured previously in the foregoing example.

Figure 4:
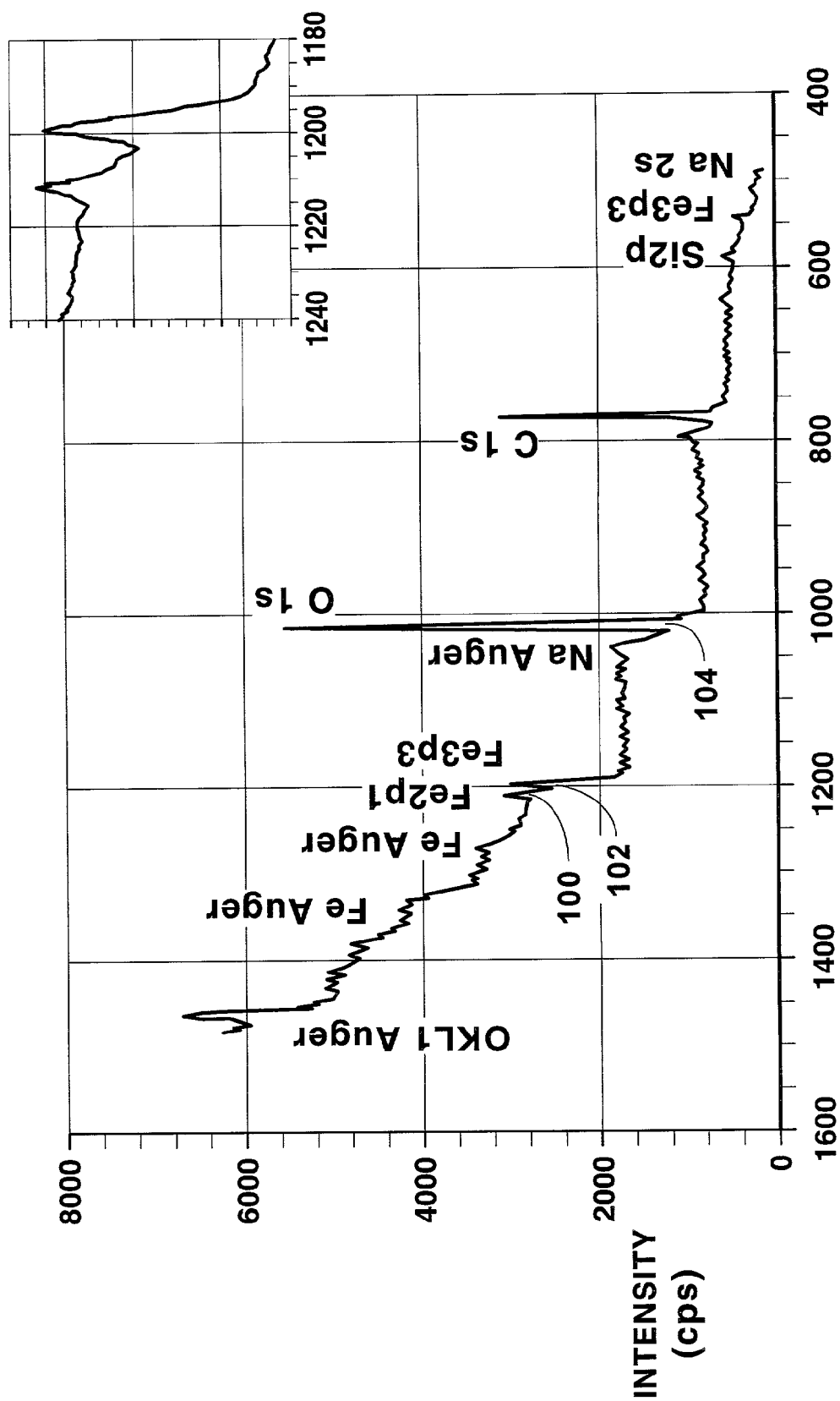
FIG. 4 provides XPS spectra of the solution side of a free-standing film created as in Example 2.
Figure 5:
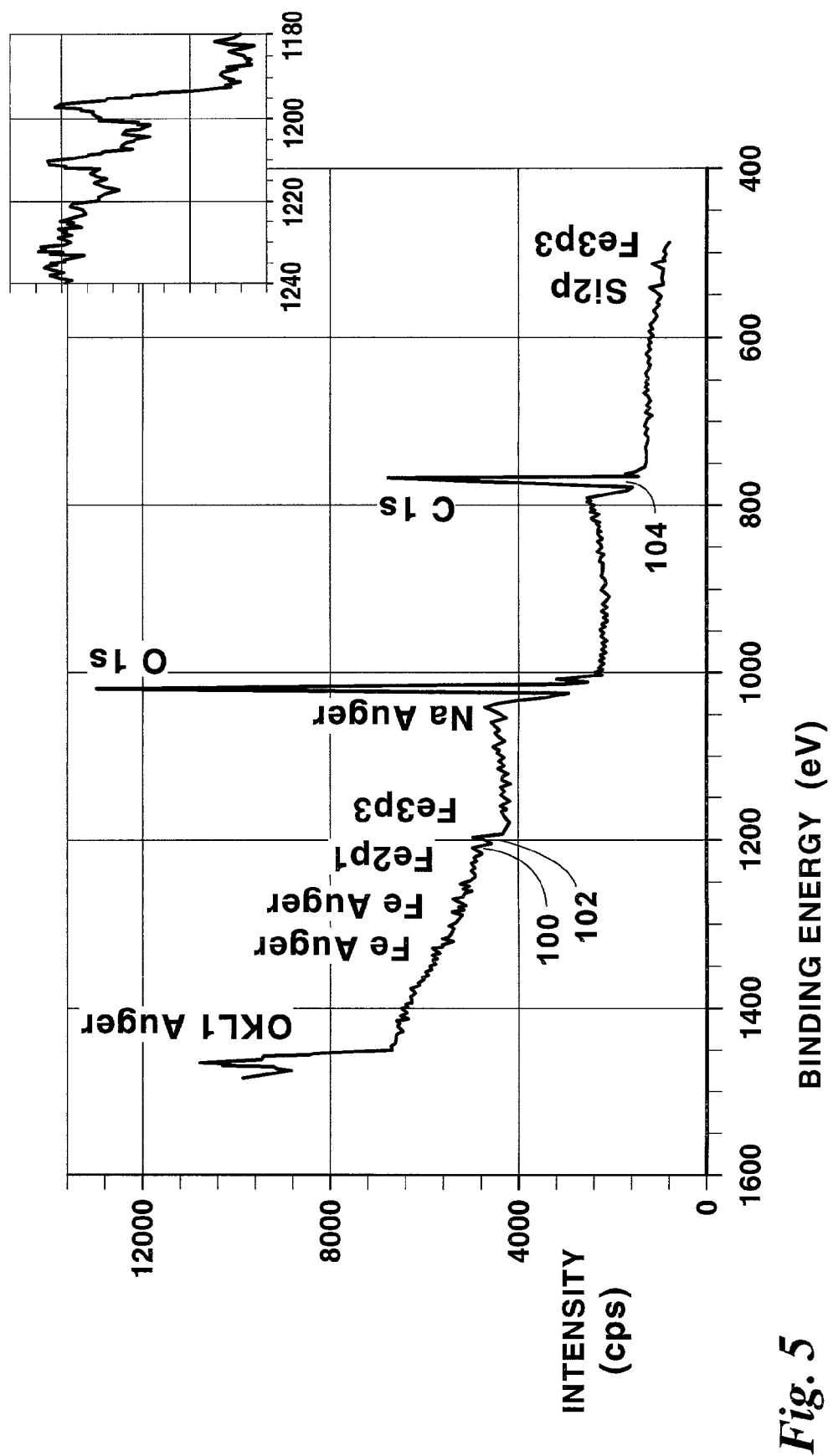
FIG. 5 provides XPS spectra of the cellulose acetate side of a free standing film created as in Example 2.

In this example, it was important to establish the identity of both surfaces of the assembled film to ensure completeness of the cellulose acetate removal, which might have contributed to the strength of the film. Scanning electron microscopy and XPS data taken on the side facing the solution (FIG. 4) and the cellulose acetate side (FIG. 5) during the deposition revealed complete identity of each surface in respect to both composition and relief. In particular, the observation of the Fe 2p1 100 and Fe 3p3 102 peaks (1121 eV and 1198 eV, respectively) would not have been possible on the cellulose acetate side of the film if any cellulose acetate, even a film of a few nanometers, remained. This clearly indicates the self-supporting nature of the film subsequent to lift-off from the substrate. The identical intensity of the iron peaks referenced to the intensity of the carbon 1s peak 104 for both surfaces of a film, clearly indicates completeness of the cellulose acetate removal.

It will be apparent to those skilled in the art that this technique can be extended to a variety of other compounds utilized in LBL research, i.e. polymers, proteins, dyes, metal and semiconductor nanoparticles, vesicles, viruses, DNA, and the like. The functional properties of a given film may be adjusted by varying the layer sequence.

It will also be apparent to those skilled in the art that the process herein described for improving the physical properties of a film could be applied to a large variety of thin film assemblies.

While the invention has been described with a certain degree of particularity, it is manifest that many changes may be made in the details of the process of assembly without departing from the spirit and scope of this disclosure. It is understood that the invention is not limited to the experimental methods set forth herein for purposes of exemplification.

What is claimed is:

1. A method for the assembly of a composite polymeric membrane comprising the steps of:
    (a) forming a composite polymeric membrane comprised of a plurality of layers, wherein at least one of said layers comprise a polymeric material and wherein each of said layers has average thickness of less than 100 nm, said composite polymeric membrane formed upon a substrate by the substeps of:
        (i) immersing said substrate in a first aqueous solution or dispersion of a first substance, said first substance having an affinity for said substrate, to form a first layer;
        (ii) rinsing said substrate with neat solvent;
        (iii) immersing said substrate in a second solution or dispersion of a second substance said second substance having an affinity for said first substance to form a second layer;
        (iv) rinsing said substrate with neat solvent; and
    (b) separating said substrate from said composite polymeric membrane, overcoming the affinity between said first layer of said first substance and said substrate while retaining the affinity between said first substance and said second substance in said additional layers.

2. The method of claim 1 further comprising the step of: applying said substrate to a support surface before said step of forming said composite polymeric membrane.

3. The method of claim 2 wherein step (b) comprises the steps of:
(i) removing at least a portion of said substrate together with said composite polymeric membrane from said support surface; and
(ii) separating said substrate from said composite polymeric membrane.

4. The method of claim 1 wherein step (b) comprises:
dissolving, melting, etching or destroying said substrate in a solvent that does not destroy said composite polymeric membrane.

5. The method of claim 1 wherein step (b) comprises the steps of:
melting said substrate at a temperature that does not destroy said layer-by-layer thin film.

6. The method of claim 1 wherein step (b) comprises the steps of:
chemically or physically treating said thin film assembly to destroy bonds between said substrate and said thin film without destroying said composite polymeric membrane.

7. The method of claim 1 further comprising the step of:
for at least one repetition of step (a)(i), replacing said first aqueous solution or dispersion of said first substance with a solution or dispersion of a third substance, said third substance having an affinity to said second substance.

8. The method of claim 1 further comprising the step of:
for at least one repetition of step (a)(iii), replacing the second solution or dispersion of said second substance with a solution or dispersion of a fourth substance, said fourth substance having an affinity to said first substance.

9. The method of claim 1 wherein:
for at least one repetition of step (a)(i), said first aqueous solution or dispersion of said first substance is of a biological compound.

10. The method of claim 1 wherein:
for at least one repetition of step (a)(iii), said second solution or dispersion of said second substance is of a biological compound.

11. The method of claim 1 wherein:
for at least one repetition of step (a)(i), said first aqueous solution or dispersion of said first substance is comprised of a structural stabilizing material selected from a group consisting of macromolecules, exfoliated clay platelets, nanoparticles, nanowires, and carbon nanotubes.

12. The method of claim 1 wherein:
for at least one repetition of step (a)(iii), said second solution or dispersion of said second substance is comprised of a structural stabilizing material selected from a group consisting of macromolecules, exfoliated clay platelets, nanoparticles, nanowires, and carbon nanotubes.

13. The method of claim 1 further comprising the step of:
inducing cross-linking between said layers by means selected from a group consisting of chemical, radiative, photoreactive and thermal means.

14. The method of claim 1 further comprising the step of
repeating steps (a)(i) through (a)(iv) a predetermined number of times to form additional layers.

* * * * *

UNITED STATES PATENT AND TRADEMARK OFFICE
CERTIFICATE OF CORRECTION

PATENT NO. : 7,045,087 B2  Page 1 of 1
APPLICATION NO. : 09/818001
DATED : May 16, 2006
INVENTOR(S) : Nicholas A. Kotov It is certified that error appears in the above-identified patent and that said Letters Patent is hereby corrected as shown below:

On The Title Page Item (75) Inventor:
    Add --Arif A. Mamedov, Stillwater, OK (US)--.

Signed and Sealed this

Twenty-eighth Day of November, 2006

JON W. DUDAS
*Director of the United States Patent and Trademark Office*

UNITED STATES PATENT AND TRADEMARK OFFICE
CERTIFICATE OF CORRECTION

PATENT NO. : 7,045,087 B2 Page 1 of 1
APPLICATION NO. : 09/818001
DATED : May 16, 2006
INVENTOR(S) : Kotov et al.

It is certified that error appears in the above-identified patent and that said Letters Patent is hereby corrected as shown below:

In column 8, line 15, replace "1121" with --1211--.

Signed and Sealed this

Fourth Day of September, 2007

JON W. DUDAS
*Director of the United States Patent and Trademark Office*